J. WONDERLIN.
HORSE OR MULE SHOE.
No. 109,701
Patented Nov. 29, 1870.
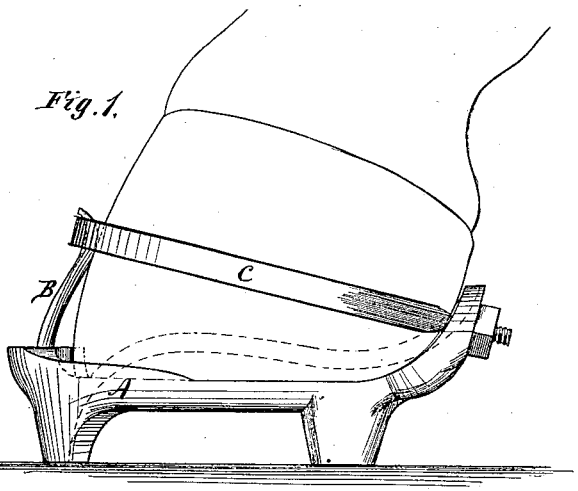
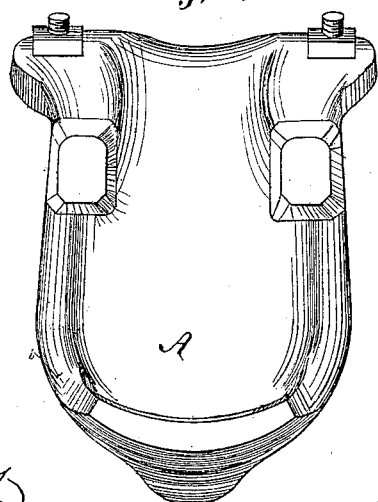
Witnesses:
Inventor:

United States Patent Office.

JOHN WONDERLIN, OF LOUISVILLE, KENTUCKY.

IMPROVEMENT IN HORSE OR MULE SHOES.

Specification forming part of Letters Patent No. 109,701, dated November 29, 1870.

*To all whom it may concern:*

Be it known that I, JOHN WONDERLIN, of the city of Louisville, county of Jefferson, and State of Kentucky, have invented a certain new and useful Improvement in Horse or Mule Shoes, of which the following is a specification.

This invention consists in a shoe made of cast or malleable cast-iron, made so as to cover the whole under surface of the hoof, with a depression in the under side to correspond with the shape of the hoof, with all the necessary projections on the under side of the shoe in order to give traction. In the upper side of this shoe, immediately around the edge where the hoof rests on it, there is a slight depression or groove, made to correspond with the shape of the hoof, for the purpose of keeping it in its place, and immediately in front of the shoe there is a small projection, in which a small wrought-iron hook is cast, extending up the front of the hoof about one and one-half inch, and turned down at the top, so as to catch and hold firmly in its place a small wrought-iron band or stirrup, made of flat iron, with screw-nuts on the ends, and so bent as to fit neatly around the front of the hoof, cutting slightly into the sides as the ends run back through holes made in the raised back end of the shoe, which, when closely screwed up, holds it firmly to the hoof without the use of nails, and in order to prevent the nuts from working off the end of the stirrup is slightly riveted.

The great advantages derived from the use of this invention are the fact that it is more economical, and prevents the hoof from being liable to injury from nails or otherwise, and does not require the use of nails to secure it to the hoof, which would greatly tend to injure it.

Having thus fully described the nature of my invention, a more perfect understanding of which may be had by reference to the drawings—

Figure 1 is a view of the hoof and shoe complete. Fig. 2 is a view of the under side of the shoe.

A is the shoe, which is made of either cast or malleable cast-iron.

B is a small wrought-iron hook, cast in a projection on the front of the shoe, by which it is held up to the hoof.

C is a small wrought-iron band or stirrup passing around the front of the hoof, and through holes in the raised back end of the shoe, by means of which it is held firmly to the hoof when the screw-nuts on the ends are closed up tightly.

Having thus fully described the drawings, I do not claim the fastening of the shoe by means of a metallic band passing around the hoof under a hook attached to the shoe, and secured by screw-nuts, as this is not new; but

What I claim as new, and desire to secure by Letters Patent, is—

The shoe A, having a depression in the under side, when made to cover the entire under surface of the hoof, and provided with toe and heel calks, a hook, B, metallic band C, and tightening-nuts D, all substantially as herein described.

JNO. WONDERLIN.

Witnesses:
 E. F. HUYCK,
 JOHN MOTSCHMAN.